H. WILBERT.
VEHICLE WHEEL ATTACHMENT.
APPLICATION FILED MAY 27, 1918.
1,276,468.
Patented Aug. 20, 1918.
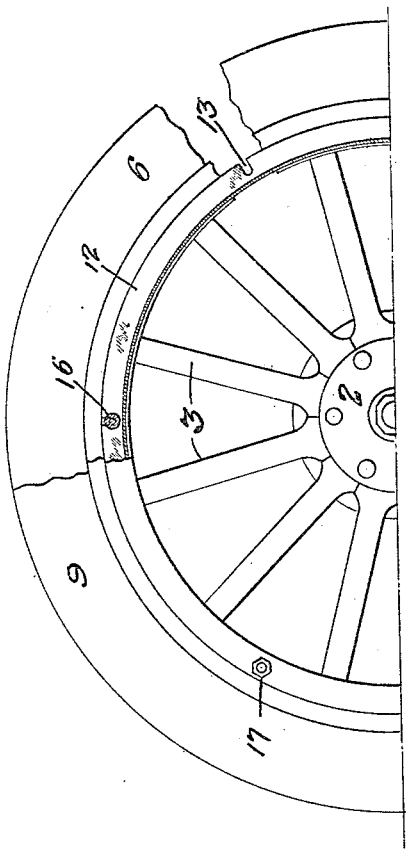
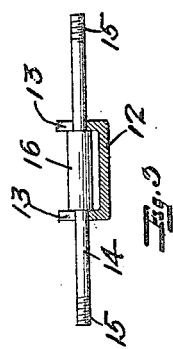
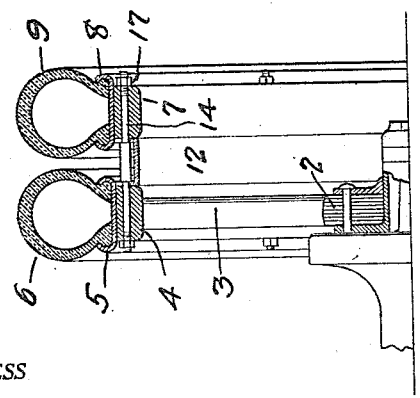
WITNESS
J. B. Gardner
INVENTOR.
H. WILBERT
BY White & Prott
ATTORNEYS

UNITED STATES PATENT OFFICE.

HORACE WILBERT, OF SAN FRANCISCO, CALIFORNIA.

VEHICLE-WHEEL ATTACHMENT.

1,276,468.   Specification of Letters Patent.   Patented Aug. 20, 1918.

Application filed May 27, 1918.   Serial No. 236,685.

*To all whom it may concern:*

Be it known that I, HORACE WILBERT, a citizen of the United States, and a resident of the city and county of San Francisco, State of California, have invented a certain new and useful Vehicle-Wheel Attachment, of which the following is a specification.

The invention relates to vehicle wheels and particularly to dual tread wheels for power propelled vehicles.

An object of the invention is to provide a simple wheel attachment for producing a dual tread wheel.

Another object of the invention is to provide a removable attachment for producing a dual tread wheel.

The invention possesses other advantageous features, some of which, with the foregoing, will be set forth at length in the following description where I shall outline in full, that form of the invention which I have selected for illustration in the drawings accompanying and forming part of the present specification. In said drawings I have shown one specific form of the wheel attachment of my invention, but it is to be understood that I do not limit myself to such form, since the invention, as expressed in the claims, may be embodied in a plurality of forms.

Referring to said drawings:

Figure 1 is a vertical cross section of half of the wheel of my invention.

Fig. 2 is a side elevation of half of the wheel, parts thereof being broken away to disclose the construction.

Fig. 3 is a cross section of the spacer channel showing a stud therein.

The dual tread wheel of my invention consists of a wheel having the felly and rim of another wheel attached thereto and spaced therefrom. The first wheel is of ordinary construction, comprising a hub 2, spokes 3, felly 4, rim 5 and tire 6.

The second wheel part consists of the felly 7, the rim 8 and the tire 9, and may be formed by removing the spokes from an ordinary wheel. The two fellies are of the same diameter and means are provided for tightly securing them together in spaced relation. Arranged between the two fellies 4 and 7, is a circular spacing member 12, preferably formed of a channel, which has the same outside diameter as the fellies, so that it fits snugly within the rims. The channel is provided at regularly spaced points circumferentially with slots 13, in which the studs 14 are disposed. The studs are provided with screw threaded ends 15 which extend through holes in the fellies and with an enlarged central portion 16 which fits within the channel, centering the stud and acting as a spacer. Nuts are screwed to the ends of the studs to securely tie the wheel parts together. The outer wheel part may be readily removed by removing the nuts 17 on the studs and pulling the outer wheel part off.

I claim:

1. The combination with a wheel having a felly, of a second wheel part having a felly, a circular spacing element interposed between said fellies, and studs passing through said spacing element and fellies and securing them together.

2. The combination with a wheel having a felly, of a second wheel part having a felly, a channel member interposed between said fellies and studs passing through said channel member and fellies and securing them together.

3. The combination with a wheel having a felly, of a second wheel part having a felly, a channel member interposed between said fellies provided with spaced slots and studs seated in said slots and extending through said fellies.

4. The combination with a wheel having a felly, of a second wheel part having a felly, a channel member interposed between said fellies provided with spaced slots, studs seated in said slots and extending through said fellies and enlarged portions on said studs seated in said channel.

5. The combination with a wheel having a felly and a rim, of a second wheel part having a felly and a rim, a circular channel member arranged within said rims and between said fellies, said channel member being provided with a plurality of regularly spaced radial slots, studs seated in said slots and extending through said fellies and central enlarged portions on said studs disposed within said channel member.

In testimony whereof, I have hereunto set my hand at San Francisco, California, this 17th day of May, 1918.

HORACE WILBERT.

Copies of this patent may be obtained for five cents each, by addressing the "Commissioner of Patents, Washington, D. C."